UNITED STATES PATENT OFFICE.

JOSEPH LOEWENHERZ, OF HOBOKEN, NEW JERSEY.

IMPROVED SALVE FOR THE EYES.

Specification forming part of Letters Patent No. 44,436, dated September 27, 1864.

*To all whom it may concern:*

Be it known that I, Dr. JOSEPH LOEWENHERZ, of Hoboken, in the county of Hudson and State of New Jersey, have invented a new and Improved Salve for the Eyes; and I do hereby declare that the following is a full, clear, and exact description thereof, which will enable others skilled in the art to make and use the same.

This invention consists in a composition of a number of materials, some of which are already used in treating diseases of the eyes, but which, when used in combination, produce a really wonderful effect in curing the Egyptian sickness of the eyes and all sorts of inflammations; also, in removing spots formed in the eyes by previous faulty treatment, and in strengthening weak eyes.

The various ingredients composing this salve are mixed together in about the following proportion: butter of cocoa, one thousand nine hundred and twenty parts; goose-fat, five thousand seven hundred and sixty parts; cinnabar, seven parts; red oxide of mercury, forty-eight parts; flowers of zinc, two hundred and forty parts; white mercury, ($HgCl+H_2NHg$,) forty-eight parts; opium, sixty parts. These ingredients are well mixed together in the usual manner by rubbing, pounding, and crutching in suitable vessels, and after they have been intimately mixed the composition is ready for immediate use. It is put up in small vials and used according to directions, which will be given to patients to suit their particular diseases. It can be left in the hands of patients without danger. Its excessive use would produce no injurious effect, and when properly put up it will keep for a very long time and rather improve, because when it stands the ingredients combine more and more intimately. It has been used with the best effect for all kinds of diseases of the eyes, and it will be of particular benefit for soldiers in the army, the eyes of many of whom are seriously affected by changes in the temperature and exposure in wet and dry, hot and cold weather.

I claim as new and desire to secure by Letters Patent—

A salve for the eyes, composed of the within-described ingredients, mixed together substantially in the manner and about in the proportion set forth.

JOSEPH LOEWENHERZ.

Witnesses:
W. HAUFF,
J. F. BUCKLEY.